United States Patent [19]
Anderson

[11] Patent Number: 5,321,061
[45] Date of Patent: Jun. 14, 1994

[54] UNIVERSALLY PAINTABLE PASSIVATED GALVANIZED STEEL

[75] Inventor: Karl P. Anderson, Columbus, Ohio

[73] Assignee: Morton Coatings, Inc., Chicago, Ill.

[21] Appl. No.: 73,865

[22] Filed: Jun. 8, 1993

Related U.S. Application Data

[62] Division of Ser. No. 905,970, Jun. 29, 1992, Pat. No. 5,252,363.

[51] Int. Cl.$^5$ .............................................. C08K 3/10
[52] U.S. Cl. .................................. 523/402; 523/414; 523/426
[58] Field of Search .................... 523/402, 414, 426

[56] References Cited

U.S. PATENT DOCUMENTS

| | | | |
|---|---|---|---|
| 2,477,310 | 7/1949 | McLean et al. | 148/6.10 |
| 3,185,596 | 5/1965 | Schiffman | 148/6.16 |
| 3,382,081 | 5/1968 | Cutter et al. | 106/14 |
| 3,413,158 | 11/1968 | Inouye et al. | 148/6.2 |
| 3,713,904 | 1/1973 | Bernath et al. | 148/6.16 |
| 4,075,153 | 2/1978 | Leo | 523/415 |
| 4,170,671 | 10/1979 | Hirasawa et al. | 148/6.2 |
| 4,183,772 | 1/1980 | Davis | 148/6.16 |
| 4,544,686 | 10/1985 | Bromley et al. | 523/402 |
| 4,637,839 | 1/1987 | Hall | 148/6.2 |
| 5,001,173 | 3/1991 | Anderson et al. | 523/406 |

FOREIGN PATENT DOCUMENTS

| | | |
|---|---|---|
| 0273408A2 | 7/1988 | European Pat. Off. |
| 5531114 | 5/1980 | Japan. |

Primary Examiner—Michael Lusigman
Assistant Examiner—Erma Cameron
Attorney, Agent, or Firm—Robert M. Didrick; Gerald K. White

[57] ABSTRACT

This invention relates to aqueous epoxy resin-containing compositions which are particularly useful for depositing coatings on freshly galvanized metals in order to protect the metal against white rust and provide a surface which is universally paintable. The aqueous compositions generally comprise (A) an oxidized alkyl ester of a dibasic carboxylic acid, (B) trivalent chromium, (C) hexavalent chromium, (D) an organic resin component consisting essentially of at least one water-dispersible or emulsifiable epoxy resin or a mixture of resins containing more than 50% by weight of at least one water-dispersible or emulsifiable epoxy resin, and (E) water, said composition being further characterized as being substantially free of strontium chromate. The wet coating on a metal substrate may be dried at a low temperature insufficient to cause curing of the epoxy resin and then be painted with any primer coating immediately or thereafter and with decorative topcoats for building materials, appliances, and automobiles. The invention also relates to metal substrates having the passivating coating on their surfaces.

6 Claims, No Drawings

UNIVERSALLY PAINTABLE PASSIVATED GALVANIZED STEEL

This is a divisional of co-pending application Ser. No. 07/905,970 filed on Jun. 29, 1992, now U.S. Pat. No. 5,252,363.

TECHNICAL FIELD

This invention relates to an aqueous epoxy resin-containing composition which is useful for coating metallic substrates in order to passivate their surfaces against corrosion. It relates particularly to a no bake passivating composition contained in one package. More particularly, it relates to galvanized steel substrates coated with the passivating composition of the present invention which are universally paintable even after time delays which normally render chromate passivated galvanized steel unpaintable.

BACKGROUND OF THE INVENTION

The problem with passivating coating compositions is the fact that most paints do not adhere well to the passivated metal surface about 48 hours after passivation. Steel mills engaged in galvanizing sheet metal have traditionally considered metal which had been chrome passivated to be unpaintable after 48 hours unless the passivation coating has been removed by brushing. Thus, they keep two stocks of their product: oiled stock for fabricators who wish to paint the metal soon after receipt and a passivated stock for customers who do not wish to paint the metal. Although it has been discovered recently that many of the passivated galvanized metals that were previously thought unpaintable can actually be painted with a urethane-based primer such as is taught in U.S. Pat. No. 5,001,173, those passivated metals still are not universally paintable.

In the '173 patent, my colleagues and I disclosed an aqueous epoxy resin coating composition containing chromium trioxide. It is an excellent passivant and has had considerable commercial acceptance but this coating, though closer to being universally paintable than other passivating coatings, requires baking to achieve its passivating properties. One-package systems of the '173 composition are stable for the short term but for long term storage the chromium trioxide is supplied in a solution separate from the epoxy resin component. Dibasic acid esters available from DuPont under the general trade designation DBE are taught in the '173 patent as solvents in the resinous portions of the aqueous coating composition and in the total composition to which the aqueous solution of chromium trioxide has been added.

According to European Patent Application No. 0 273 408, the known processes for the production of water-based corrosion resistant coatings for galvanized steel have the disadvantage that a large portion of the hexavalent chromium is not reduced by the organic resin which is present in each of them. Hexavalent chromium may thus be released from the coating on the metal, which limits the utility of the metal. The addition of a water soluble organic compound having a boiling point exceeding 100° C. and at least one $CH_2OH$- group and/or at least one =CHOH- group to a water-based coating agent containing hexavalent chromium, and a film-forming organic polymer prevents the release of hexavalent chromium when in contact with aqueous solutions and prevents the loss of corrosion resistance. The coatings are heated at from 100° to 300° C.

U.S. Pat. No. 3,185,596 teaches corrosion resistance imparting solutions that contain mixtures of hexavalent and trivalent chromium and water soluble or water dispersible polyacrylic acid. Chromic acid is reduced by formaldehyde in aqueous solution. At least 5% and as much as 60% of the hexavalent chromium is reduced. The patent teaches a composition which will yield a coating which has greatly improved corrosion and impact resistance, flexibility, and paint bonding. It exhibits excellent performance under vinyl paints but is not satisfactory under polyester paints.

A modification and extension of the teaching of the '596 patent is taught in U.S. Pat. No. 4,183,772 whereby the coating composition is made to be universally useful under almost all types of paints. A lesser amount of the polyacrylic acid is used and a water dispensable acrylic emulsion polymer is added. The reduction of the hexavalent chromium and the mixing of the polyacrylic acid are accomplished in generally the same way as taught by the '596 patent but mention is made of a reaction of the polyacrylic acid with the chromium after the reduction with formaldehyde. Also, the partial reduction of hexavalent chromium is preferably controlled so that from about 46–50% is reduced although the broader range of 40 to 60% is also taught. Phosphoric acid is said to be an essential ingredient in the composition of the '772 patent rather than optional as in the '596 patent. The ratio of phosphoric acid to chromium compounds is also said in the '772 patent to be critical to the satisfactory performance of the coating under both vinyl and polyester paints.

The reduction of chromic acid by formaldehyde is utilized in U.S. Pat. No. 4,170,671 wherein a water-soluble mixture of polyacrylic acid and a copolymer of acrylic acid and an acrylate is used as an emulsifier in the polymerization of $\alpha, \beta$-monoethylenically unsaturated monomers. A mixture of the resulting emulsion and the reduced chromium is said to give a treating liquid for the preparation of a surface so that a subsequently applied coating shows excellent adhesion.

Various types of liquid coating compositions have been applied to metallic substrates and baked thereon in order to protect the substrates against corrosion. Certain of such coatings are applied in conventional metal coil coating processes, and they must be sufficiently adherent and flexible to resist cracking, chipping and peeling. One process which has been utilized for improving the corrosion resistance of various metal substrates generally involves the application of two coatings. The first coating is comprised of a material such as xanthan gum as carrier for the other ingredients of the coating which include a chromium compound such as chromium trioxide and zinc dust. On baking, the xanthan gum contained in the coating becomes water-insoluble. Generally, baked temperatures of at least about 500° F. are required. Over this baked coating is applied a second coating which comprises a zinc rich resin. Such two-step procedures for improving the corrosion-resistance of metal are described in U.S. Pat. No. 4,026,710 (Kennedy).

U.S. Pat. No. 3,713,904 (Bernath et al.) describes compositions and methods for producing corrosion-resistant and protective coatings on aluminum and aluminum alloys. The coating on the metal substrate comprises an organic resin, an organic solvent, an inorganic hexavalent chromium compound, an oxidizable component, phosphoric acid and strontium chromate. On mixing, the strontium chromate and oxidizable component react to reduce the hexavalent chromium to trivalent chromium. The mixture is applied to the substrate which is then heated at a temperature of from about 600° F. to about 800° F. to achieve a metal temperature of at least about 450° F. which results in the oxidation of a portion of trivalent chromium to hexavalent chromium resulting in a strongly adherent organic resin coating. The organic resins described include epoxy resins. The patentees also describe the application of various topcoats including vinyl topcoats and finish coats comprising strontium chromate-potassium dichromate containing fluorocarbon finish coats.

A washcoat composition suitable for application to tinplated mild steel is described in U.S. Pat. No. 4,544,686 (Bromley et al.), and the composition consists of an aqueous carrier medium and a binder comprising a thermosetting acrylic polymer, an epoxy resin, an acid catalyst which may be phosphoric acid or chromic acid or an ammonium or amine salt thereof.

According to English language abstracts of Japanese Patent Applications Nos. 59052645A and 59035934A, these publications describe a weldable coated steel sheet which has been obtained by applying a first coating comprising chromium trioxide, about 50% of which has been reduced to the trivalent state, phosphoric acid, polyacrylic acid, and acrylic emulsion in water. The coated metal is then roll-coated with zinc-manganese rich coatings which contain resin such as epoxy resins. The coating then is baked at about 260° C. for one minute.

SUMMARY OF THE INVENTION

It is an object of this invention, therefore, to provide a passivating coating for metal substrates which is paintable almost immediately after being dried at a moderate temperature or at any later time.

It is a related object of this invention to provide an aqueous, epoxy resin-containing, metal passivant composition which need not be cured to be universally paintable.

It is a further related object of this invention to provide a one package passivating composition containing water, an epoxy resin, hexavalent chromium and trivalent chromium which is stable under normal storage conditions for an indefinitely long time.

It is another object of this invention to make it possible to eliminate the need for keeping two stocks of galvanized steel, one stock of paintable but non-passivated metal and another of passivated but not universally paintable metal.

It is a related object to make it possible to ship galvanized steel world-wide through many climates without concern for white rust or the paintability of the steel.

These and other objects of this invention which will become apparent from the following description are achieved by an aqueous passivating composition which comprises (A) an oxidized alkyl ester of a dibasic carboxylic acid, (B) trivalent chromium, (C) hexavalent chromium, (D) an organic resin component consisting essentially of at least one water-dispersible or emulsifiable epoxy resin or a mixture of resins containing more than 50% by weight of at least one water-dispersible or emulsifiable epoxy resin, and (E) water.

These aqueous compositions are useful as pretreatment coatings on metal surfaces, and in particular, on steel and on galvanized steel substrates This pretreatment coating can then be dried at low temperature and coated with weldable or non-weldable primer coatings within minutes after being dried and anytime thereafter Decorative topcoats for building materials, appliances, and automobiles may follow. The invention also relates to metal substrates which have been coated with the pretreatment coating.

DESCRIPTION OF THE PREFERRED EMBODIMENTS

Component (A) in the aqueous compositions of the present invention is the oxidation product of the reaction of a hexavalent chromium compound such as chromium trioxide, chromic acid, or chromic anhydride with an alkyl ester of a dibasic carboxylic acid for from about 1 hour to about 72 hours or more at from about room temperature or less to about 195° F. The ester is oxidized to the extent that it becomes a part of the film-forming material when it is mixed with the resinous film-forming component (D) of the aqueous passivating composition. Examples of such esters include the dibasic esters (DBE's) mentioned above as being solvents in the aqueous coating compositions of the '173 patent. DBE's are refined dimethyl esters of adipic, glutaric and succinic acids. They are available individually and as mixtures. For example, the product identified as DBE has an ester content of 99.5% minimum and the esters comprise from 10 to 25% by weight of dimethyl adipate, 55 to 75% by weight dimethyl glutarate, and 15 to 25% by weight dimethyl succinate. A typical DBE composition is reported to comprise 17% dimethyl adipate, 66% dimethyl glutarate, 16.5% dimethyl succinate and 0.2% methanol. Another dibasic ester mixture available from DuPont under the designation DBE-3 comprises 89% by weight dimethyl adipate, 10% by weight dimethyl glutarate, 0.5% by weight dimethyl succinate and less than 0.1% methanol.

The amount of oxidized ester in the aqueous compositions of this invention is from about 2.0% to about 10% by weight, preferably about 5% or less.

Component (B) in the aqueous compositions of the present invention is the trivalent chromium which has been reduced from the hexavalent state during the oxidation of the alkyl ester of a dibasic acid. From about 10 to about 90%, preferably from about 40 to about 60%, by weight of the chromium trioxide is reduced. The portion of the hexavalent chromium that is not reduced constitutes Component (C) of the aqueous compositions of this invention and is available for reaction with the zinc metal on the surface of the freshly galvanized steel. This component of the composition reacts with the epoxy resin of the coating on the surface as well as with the zinc. The epoxy resin confers good paint adhesion properties to the coating even after complete conversion of the hexavalent chromium to the trivalent state by reaction with the zinc and a portion of the resin.

Component (D), the organic resin component of the aqueous compositions of the present invention is based upon water-dispersible or emulsifiable epoxy resins. In the first embodiment, the organic resin component will comprise a mixture of resins containing at least 50% by weight of at least one water-dispersible or emulsifiable epoxy resin. A wide variety of water-dispersible or emulsifiable epoxy resins can be utilized in the aqueous compositions of the present invention. Generally, the epoxy resins will have a molecular weight of from about 300 to about 100,000. More generally, the epoxy resins will have epoxide equivalent weight of from about 150 to about 10,000, and more particularly, an epoxide equivalent weight of from about 1000 to about 3000. In one embodiment, the epoxy resin is one which typically has a weight per epoxide unit of about 1550-2500.

The water-dispersible or emulsifiable epoxy resins used in this invention may be any one of a number of well known epoxy resins which are characterized by the presence therein of at least one epoxide group. As used in the specification and in the appended claims, epoxy resin is intended to describe the reaction products of the condensation reaction of an epihalohydrin and a hydroxy-containing compound or carboxylic acid. The epoxy resins may be of the ether or ester types although the ether type epoxy resins are preferred.

Examples of ester-type epoxy resins include polyglycidyl esters obtainable by reaction of a compound containing two or more carboxylic acid groups per molecule with epichlorohydrin or glycerol dichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Ether-type epoxy resins are obtained by reaction of a compound containing at least two free alcoholic hydroxyl and/or phenolic hydroxyl groups per molecule with an epihalohydrin under alkaline conditions, or in the alternative, in the presence of an acidic catalyst with subsequent treatment with an alkali. The products of such reactions instead of being single simple compounds are generally complex mixtures of glycidyl polyethers. Generally, however, the principal product may be represented by Formula I, as follows:

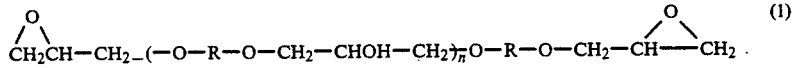

$$\overset{O}{\underset{CH_2CH}{\diagdown\diagup}}-CH_2-(-O-R-O-CH_2-CHOH-CH_2)_n-O-R-O-CH_2-\overset{O}{\underset{CH}{\diagdown\diagup}}-CH_2 \quad (1)$$

wherein n is an integer of from zero to 30 or more, and R represents the divalent hydrocarbon group of an aliphatic or aromatic polyhydroxy compound. These ethers may be made from acyclic alcohols such as ethylene glycol, diethylene glycol, and higher poly(oxyethylene) glycols, propane-1,2-diol and poly (oxypropylene) glycols, propane-1,3-diol, poly(oxytetramethylene) glycols, pentane-1,5-diol, hexane-2,4,6-triol, glycerol, 1,1,1-trimethylolpropane, pentaerythritol, sorbitol, and polyepichlorohydrins. They may also be made from cycloaliphatic alcohols such as resorcitol, quinitol, bis-(4-hydroxycyclohexyl)methane, and 2,2-bis(4-hydroxycyclohexyl) propane, and also from alcohols having aromatic nuclei, such as N,N-bis(2-hydroxyethyl)aniline and p,p'-bis(2-hydroxyethylamino) diphenylmethane. Or they may be made from mononuclear phenols, such as resorcinol and hydroquinone, and from polynuclear phenols, such as bis-(4-hydroxyphenyl) methane (otherwise known as bisphenol F), 4,4'-dihydroxydiphenyl, bis(4-hydroxyphenyl) sulphone, 1,1,2,2-tetrakis(4-hydroxyphenyl) ethane, 2,2-bis(4-hydroxyphenyl)propane, (otherwise known as bisphenol A), 2,2-bis(3,5-dibromo-4-hydroxyphenyl)propane, and novolacs formed from aldehydes such as formaldehyde, acetaldehyde, chloral, and furfuraldehyde, with phenol itself, and phenol substituted in the ring by chlorine atoms or by alkyl groups each containing up to 9 carbon atoms, such as 4-chlorophenol, 2-methylphenol, and 4-tertbutylphenol.

The value of n in Formula I is determined by the relative concentration of epichlorohydrin reactant to the polyhydroxy compound. The greater the concentration of epichlorohydrin, the lower the value of n. In general, the value of n determines many of the characteristics of the epoxy resin. For example, the resin generally is a liquid at room temperatures for values of n between 0 and about 3 and solid for values of n greater than about 3. The physical properties of the final hardened resin also are determined by the value of n since, as the value of n increases, the amount of cross-linking in the resin is increased resulting in a resin of greater strength and durability.

The epoxy resins have either a mixed aliphatic aromatic or an exclusively non-benzenoid (i.e., aliphatic or cycloaliphatic) molecular structure. The mixed aliphatic-aromatic epoxy resins generally are prepared by the well-known reaction of a bis(hydroxy-aromatic) alkane or a tetrakis-(hydroxy-aromatic) alkane with a halogen-substituted aliphatic epoxide in the presence of a base such as, for example, sodium hydroxide or potassium hydroxide.

In one preferred embodiment, the epoxy resins are diglycidyl ethers of bisphenols, such as bisphenol B, F, G and H, and especially bisphenol A, which is made by reacting epichlorohydrin with bisphenol A in the presence of an alkaline catalyst. By controlling the operating conditions and varying the ratio of epichlorohydrin to bisphenol A, products of different molecular weight can be made.

Epoxy resins of the type described above based on various bisphenols are available from a wide variety of commercial sources. One group is known by the general trade designation "Epon" resins and are available from Shell Chemical Company. For example, "Epon 820" is an epoxy resin having an average molecular weight of about 380 and is prepared from 2,2-bis-(p-hydroxyphenyl) propane and epichlorohydrin. Similarly, "Epon 1031" is an epoxy resin having an average molecular weight of about 616 and is prepared from epichlorohydrin and symmetrical tetrakis-(p-hydroxyphenol) ethane. "Epon 828" has a molecular weight of 350-400 and an epoxide equivalent of about 175-210. "Epon 1001" is an epoxy resin having an average molecular weight of about 1000 and an epoxide equivalent weight of 500. "Epon 1007" has an average molecular weight of about 4500 and an epoxy equivalency of about 2.0. "Epon 1009" has an epoxide equivalent of about 2400-4000.

Another group of commercially available epoxy resins is identified under the general trade designation EPI-REZ (Celanese Resins, a division of Celanese Coatings Company). For example, EPI-REZ 510 and EPI-REZ 509 are commercial grades of the diglycidyl ether or bisphenol A differing slightly in viscosity and epoxide equivalent. EPI-REZ 522F is a bisphenol A-epichlorohydrin resin with an epoxy equivalency of about 600.

Another class of epoxy resins useful in the present invention is the epoxidized novolacs, particularly the epoxy cresol and epoxy phenol novolacs. These are produced by reacting a novolac resin, usually formed by the reaction of orthocresol or phenol and formaldehyde with epichlorohydrin.

Epoxy resins derived from non-benzenoid materials such as aliphatic or cycloaliphatic hydroxy-containing compounds also can be utilized in the present invention. Epoxy resins having non-benzenoid molecular structures generally are referred to in the art as being aliphatic epoxy resins or cycloaliphatic epoxy resins. Cycloaliphatics can be produced by the peracetic epoxidation of cyclic olefins and by the condensation of an acid such as tetrahydrophthalic with epichlorohydrin, followed by dehydrohalogenation. The aliphatic epoxy resins can be prepared by reacting hydroxy-containing aliphatic and cycloaliphatic compounds such as aliphatic diols and triols. For example, ethylene glycol or glycerol can be reacted with a halogen-substituted aliphatic epoxide such as epichlorohydrin (and others mentioned above) to form liquid epoxy resins characterized by viscosities which are lower than epoxy resins derived from aromatic hydroxy compounds. When cured, such aliphatic epoxy resins are not as brittle as the aromatic epoxy resins, and in many instances, exhibit elastomeric properties. Aliphatic epoxy resins are available commercially from a variety of sources including, for example, Shell Chemical Company and Reichhold Chemicals, Inc. Specific examples include Epon 562 from Shell Chemical Company having a viscosity of 90–150 centipoises at about 23° C., an epoxide equivalent of 140–165, and a hydroxyl equivalent weight of about 65.

The epoxy resins will have an epoxy equivalency greater than 1.0. By epoxy equivalence, reference is made to the average number of 1,2-epoxide groups contained in the average molecule of the glycidyl ether or ester. As a result of the method of preparing the glycidyl polyethers and polyesters, and since they are ordinarily mixtures of chemical compounds having somewhat different molecular weights, the epoxy equivalency of the products is not necessarily the integer 2.0. However, the equivalency is generally a value of between 1.0 and 2.0. Epoxidized novolac resins which are useful in the present invention generally are prepared by the reaction of epichlorohydrin with phenol formaldehyde condensates. The epoxidized novolacs may contain more than two epoxy groups per molecule, and epoxidized novolacs having up to 7 to more epoxy groups are available commercially. The use of epoxidized novolacs containing more than two epoxy groups per molecule results in products containing a highly cross-linked structure.

Ultra-high molecular weight epoxy resins also may be used in the invention. A group of such resins is available from the Shell Chemical Company under the general trade designation "Eponol". The ultra-high molecular weight resins are derived from bisphenol-A and epichlorohydrin and the value of n in Formula I for Eponol Resin 53-BH-35 is about 90 whereas n is about 130 for the product identified as Eponol Resin 55-BH-30.

The organic resin component of the aqueous compositions of the present invention may comprise mixtures of epoxy resins with other water-dispersible or emulsifiable resins which are effective for modifying the properties of the epoxy resins and/or the coatings which are deposited on metal substrates from the aqueous compositions. In one preferred embodiment, the resin component comprises a mixture of an epoxy resin and at least one halogen-containing thermoplastic polymer. Halogen-containing vinyl polymers and copolymers, including vinylidene chloride homopolymers and copolymers are useful in combination with the epoxy resins. Vinylidene chloride copolymers include copolymers of vinylidene chloride with vinyl chloride, acrylates or nitriles, the choice of comonomers being dependent upon the properties desired. Polyvinylidene fluoride resins useful in combination with the epoxy resins of the present invention are available commercially from a variety of sources including Pennwalt Corporation. One specific example of a polyvinylidene fluoride available from Pennwalt is Kynar 500 resin.

The resin component of the aqueous compositions of the present invention also may comprise mixtures of epoxy resins with other resins capable of modifying the properties of the epoxy resin such as amine-formaldehyde resins, phenol-formaldehyde resins, polyamide resins, urea resins, polyolefins, polyesters, etc. as long as the additional resins do not result in a substantial decrease of other desirable properties such as adhesion, corrosion-resistance, weldability, etc.

Among the polyesters which are useful in conjunction with epoxy resins in the aqueous compositions of the present invention are polyesters of aromatic dibasic acids and alkylene glycols. The polyesters also may be derived from a mixture of aromatic dicarboxylic acids containing at least some symmetrical aromatic dicarboxylic acid, one or more acyclic dicarboxylic acids, and one or more diols. Examples of symmetrical aromatic dicarboxylic acids include terephthalic acid, bibenzoic acid, ethylene bis-p-oxy benzoic acid, tetramethylene bis-p-oxy benzoic acid, and 2,6-naphthalic acid. Other aromatic dicarboxylic acids which can be used in conjunction with the symmetrical dicarboxylic acid include o-phthalic, isophthalic acid, etc.

The glycols which are reacted with the dibasic acids to form the desired linear polyesters are glycols represented by Formula II, as follows:

$$\text{HO(Y)OPH} \tag{II}$$

wherein Y is an alkylene group containing from about 2 to about 10 carbon atoms. Examples of such glycols include ethylene glycol, 1,2- and 1,3-propanediol, 1,4-butanediol, neopentyl glycol, 1,6-hexanediol, polyethylene glycol, etc.

Representative of the acyclic dicarboxylic acids which can be incorporated into the polyesters are those characterized by Formula III, as follows:

$$\text{HOOCCH}_2\text{XCH}_2\text{COOH} \tag{III}$$

wherein X is a linear divalent hydrocarbon chain composed from 2 to about 8 atoms.

In one embodiment, mixtures of two or more acyclic dicarboxylic acids are utilized, and the acyclic dicarboxylic acids in the mixture will differ from each other by at least 3 carbon atoms in the linear chain. Specific examples of the acyclic dicarboxylic acids represented by the above Formula III include adipic acid, pimelic acid, suberic acid, azelaic acid, oxy-dibutyric acid, sebacic acid, 5-oxa-1,10-decanedioic acid, 4-n-propyl suberic acid, dodecane dioic acid, tridecane dioic acid, etc. Particularly useful combinations of aromatic and aliphatic dicarboxylic acids used in the preparation of copolyesters useful in the present invention include: terephthalic acid, azelaic acid and pentamethyleneglycol; terephthalic acid, isophthalic acid and adipic acid; terephthalic acid, isophthalic acid, adipic acid and sebacic acid; terephthalic acid, isophthalic acid, adipic acid and ethylene glycol; etc. Copolyesters of such mixtures can be prepared by known techniques, and they may be prepared directly from the above-identified dicarboxylic acids, or the copolyesters can be prepared from the lower alkyl esters of said dicarboxylic acids such as dimethyl terephthalate, dimethyl isophthalate, dimethyl sebacate, dimethyl adibate, etc. Procedures for preparing copolyesters useful in combination with the epoxy resins in this invention are described in, for example, U.S. Pat. Nos. 2,623,033 (Snyder) and 2,892,747 (Dye), both of which patents are hereby incorporated by reference for their disclosure of linear copolyesters derived at least in part from symmetrical aromatic dicarboxylic acids.

In one preferred embodiment, the polyesters which are utilized in combination with the epoxy resins are linear polyesters of aromatic dibasic acids and alkylene glycols. Generally, these polyesters are derived from a mixture of aromatic dibasic acids such as terephthalic and isophthalic acid with an alkylene glycol containing from 2 to about 6 or 8 carbon atoms in the alkylene group. Examples of such glycols include ethylene glycol, trimethylene glycol, 1,4-butylene glycol, etc. In addition to the aromatic dicarboxylic acids and the alkylene glycol, the reaction mixture also may, and preferably does contain, an acyclic dicarboxylic acid. The relative amounts of aromatic dicarboxylic acid and a cyclic dicarboxylic acid may be varied in order to obtain polyesters having different characteristics. In general, the ratio of equivalents of aromatic dicarboxylic acids to acyclic dicarboxylic acid will be from about 2:1 to about 1:2 and more generally about 1:1. The ratio of dicarboxylic acid to glycol also may be varied, and the glycol is generally present in excess amounts. Thus, ratios of dicarboxylic acids to diol generally are from about 1:1 to about 1:2.

The reaction between the dicarboxylic acid mixture and the diol generally is effected by heating the mixture to an elevated temperature in the presence of catalysts. Tin catalysts are especially useful for such purposes, and examples include dibutyl tin oxide and dibutyl tin dilaurate. Other catalysts which may be utilized include antimony oxide. The polyesters and copolyesters prepared in this manner generally will have molecular weights of from about 5000 to about 50,000 and will be further characterized as having hydroxyl numbers of between about 5 and 15.

The following are examples of polyesters which can be utilized in the compositions of the present invention. Unless otherwise indicated in the following examples, or elsewhere in the specification and claims, all parts and percentages are by weight, and all temperatures are in degrees centigrade.

POLYESTER EXAMPLE 1

Into a reaction vessel there is charged 387.6 parts (12.5 equivalents) of ethylene glycol, 228 parts (2.75 equivalents) of terephthalic acid, 117.6 parts (1.42 equivalents) of isophthalic acid, 396 parts (4.2 equivalents) of azelaic acid (Emerox 1144), and 0.42 part of antimony trioxide. An inert atmosphere is maintained and the mixture is heated to 240° C. with stirring while holding the vapor temperature below 125° C. A mixture of water and glycol (184 parts) is removed. When the batch temperature reaches 240° C., the reactor is adapted for vacuum processing and the pressure is reduced to about 25 mm. Hg. over 1.25 hours while raising the temperature to 250° C. The reaction is terminated 15 minutes after full vacuum is attained, and the vacuum is broken with nitrogen. The molecular weight of the polyester prepared in this manner is about 35,000, and the polyester is further characterized as having a hydroxyl number of about 8.9 and a hydroxy-to-carboxy ratio 1.06.

POLYESTER EXAMPLE 2

A reactor is charged with 17.08 parts of ethylene glycol, 35.31 parts of neopentyl glycol, 36.81 parts of isophthalic acid, 36.83 parts of terephthalic acid, 0.07 part of dibutyl tin octoate, and 0.13 part of triphenyl phosphite. The mixture is heated to 230° C. using an inert sparge. The exhaust temperature is maintained at or below 110° C. as the reaction mixture is heated to 230° C. The mixture then is maintained at 225°–230° C. until the acid number of the mixture is below 5. When the desired acid number is attained, the reactor is adapted for vacuum, and a vacuum of 3 mm. Hg. or less is maintained at a temperature of about 250° C. This temperature and vacuum level are maintained for a period of about 7.5 hours until the viscosity of the reactor contents is approximately L (at 40% in MEK). The reaction mixture then is cooled and recovered. The molecular weight of this polyester is about 17,500 and the polyester is characterized as having a hydroxyl number of about 8.

Preferably, the aqueous compositions of the present invention will comprise from about 2% to about 10% of the oxidized ester; from about 0.5 to about 7% by weight of hexavalent and trivalent chromium, taken together; from about 2 to about 25% by weight of an organic resin component consisting essentially of at least one water-dispersible or emulsifiable epoxy resin or a mixture of resins containing more than 50% by weight of at least one water-dispersible or emulsifiable epoxy resin; and from about 25 to about 97% by weight of water. The amount of trivalent chromium in the aqueous composition of this invention is from about 0.05 to about 6.3% by weight.

The aqueous compositions of the present invention may be prepared by mixing the various components utilizing techniques well known to those skilled in the art. The chromic acid or other hexavalent chromium compound may be reacted with the dialkyl ester without the presence of water or other inert liquid to act as a coolant but it is preferred to dissolve the chromic acid in a large quantity of water and then add the ester. Suitably, the alkyl ester is added to a solution of the chromium trioxide in water at room temperature and the mixture allowed to stand for up to 72 hours or more, during which the exotherm of the oxidation causes the temperature of the mixture to rise to about 195° F. The mixture of ester, water and chromium trioxide may be stirred to help the reaction. The weight ratio of water to the ester may be as low as about 2:1 or 3.5:1 but it is preferred to be at least 15:1. The weight ratio of water to the chromic acid is preferably from about 6:1 to about 40:1 and the weight ratio of chromic acid to the ester is preferably from about 4:1 to about 1:3.

The water dispersed epoxy resin is then added to the aqueous solution of oxidized ester, unreduced chromium trioxide, and trivalent chromium compounds. Conventional procedures such as, for example, high speed agitation using a homo mixer or a dispersion mill, Brabender and Banbury mixers can be utilized for preparing the aqueous compositions of the present invention.

The other ingredients of the passivating composition are suitably added last and mixed in similar fashion. It is highly preferable that the composition also contain phosphoric acid or an alkyl phosphoric acid. Examples of alkyl phosphoric acids include the lower alkyl phosphoric acids such as methyl phosphoric acid, ethyl phosphoric acid, propyl phosphoric acid, and butyl phosphoric acid. Generally, when the aqueous compositions of the present invention contain phosphoric acid or an alkyl phosphoric acid, only small amounts such as, for example, from about 0.1 to about 3% by weight of phosphoric acid or butyl phosphoric acid are included in the aqueous compositions and this amount is sufficient to provide improved properties.

The aqueous compositions of the invention also may contain small amounts (e.g., 0.1 to 5% w) of organic solvents and water-compatible or organic lubricants and colorants. In addition to being a reactant with chromium trioxide as discussed above, the dibasic acid esters known generally as DBE's may be used as organic solvents for the total composition. Lubricants may be included to improve polymer flow and coating properties. Examples of lubricants which can be included in the aqueous compositions include glycerol esters, fatty acids, fatty acid esters, fatty acid amides, fatty acid salts, fatty alcohols, etc. Examples of such lubricants include: glycerol monostearate, calcium stearate, zinc stearate, silicone, polythylene waxes, polytetrafluoroethylene (PTFE), and mixtures of said waxes and PTFE.

The aqueous compositions of this invention are one package coating compositions which, upon drying of the wet coating composition at low temperatures insufficient to effect curing of the epoxy resin, provide basecoats for metallic substrates which impart corrosion resistance and are universally paintable even after long standing. The metallic substrates may be cold rolled and hot rolled steel, aluminized steel, and galvanized surfaces such as hot-dipped galvanized and electro-galvanized steel, galvalume, galvaneal, etc. The aqueous composition of this invention is easily applied to metal sheets by a coil coating technique such as flood squeegee, direct roll, and reverse coat and by other known techniques including dipping, spraying, roller coating, bar coating, etc. The composition is generally applied to the metal substrates in sufficient amounts to provide from 10–50 mg/ft2 of a basecoat on a dry basis although heavier or lighter coatings may be applied. A basecoat may typically have a thickness of about 0.03 mil. After application of the aqueous coating composition to the metal substrate, the coating is preferably dried at a temperature sufficient to heat the metal to a temperature of from about 130° to about 300° F. although drying at room temperature is suitable. Because the aqueous compositions of this invention are film-formers and have substantial amounts of epoxy resin therein, they can be applied to both sides of a metal coil and then dried. The coated coil is then ready to receive a primer coat or a topcoat on each side in a subsequent coil coating operation. Alternatively, the basecoat coating can be used as the only coating on the coil. The basecoating composition can be simultaneously applied to both sides of a moving coil strip.

The following example further illustrates the passivating composition of this invention and the method for making it. All parts are by weight.

EXAMPLE OF PASSIVATING COMPOSITION

A mixture of 12.5 parts of water, 3.7 parts of a mixture of dimethyl esters of adipic, glutaric, and succinic acids (DBE, Dupont), 1.7 parts of chromium trioxide, and 0.14 part of phosphoric acid was allowed to stand in a reaction vessel for about 72 hours. The exothermic reaction caused the temperature to rise to about 185° F. An aqueous suspension of chromic oxide in a solution of the oxidized esters, hexavalent chromium, and phosphoric acid was obtained. To this suspension there was added 20 parts of an epoxy resin sold under the trademark and number Interez 3540 (EEW=2000-2500, 55% solids) and 61.5 parts of water. The resulting solution was applied to freshly galvanized steel by a flood squeegee and a 0.03 mil thick passivating coating was obtained upon drying it at a peak metal temperature of about 150° F. The metal was painted 3 days later with Oxythane ® urethane-based primer (Morton) and a Polyceram ® 340 polyester-based topcoat paint (Morton).

The adhesion and flexibility of the coatings was tested by the T-bend test wherein a strip of the painted metal is bent back upon itself and a piece of tape is placed over the bend and pulled off to see if any loose paint comes off with the tape. The severity of the test decreases as the number of thicknesses (called zero T, 1 T and so on to 5 T) of the strip around which the strip is bent increases. A strip of the metal coated according to the above Example and bent over 1 T gave no tape off of paint.

The corrosion-resistant characteristics of the passivating composition of this invention was determined by subjecting the metal from the above Example to the salt spray test of ASTM-B117. In this test, a scratch (or scribe) is made through the paint coating with a sharp instrument so as to expose the underlying metal. The scratched panel is then placed in a chamber at about 95° F. where it is contacted with a spray of 5% aqueous salt solution. After 500 hours, the maximum creep from the scribe was less than ¼ inch and after 1000 hours it was about ⅜ inch. There was no creep at all from the cut edge of the panel.

While the invention has explained with reference to its embodiments, it will be understood that various modifications will become apparent to those skilled in the art upon reading the specification. Therefore, it should be understood that the invention includes all modifications within the scope of the appended claim.

The subject matter claimed is:

1. An aqueous passivating composition which comprises (A) an oxidized alkyl ester of a dibasic carboxylic acid, (B) trivalent chromium, (C) hexavalent chromium, (D) an organic resin component consisting essentially of at least one water-dispersible or emulsifiable epoxy resin or a mixture of resins containing more than 50% by weight of at least one water-dispersible or emulsifiable epoxy resin, and (E) water, said composition further characterized as being substantially free of strontium chromate.

2. The composition of claim 1 wherein the oxidized ester is an oxidized dialkyl ester.

3. The composition of claim 2 wherein the ester is an oxidized mixture of dimethyl esters.

4. The composition of claim 1 wherein the oxidized ester is the oxidation product of the reaction between the alkyl ester and hexavalent chromium.

5. The composition of claim 1 wherein the amount of the oxidized ester is from about 2% to about 10% by weight.

6. The composition of claim 1 wherein the trivalent chromium is from about 0.05% to about 6.3% of the total weight.

* * * * *